March 11, 1930.                J. H. WRIGHT                1,750,147
                            PLANT DUSTING MACHINE
                            Filed June 6, 1927        4 Sheets-Sheet 1
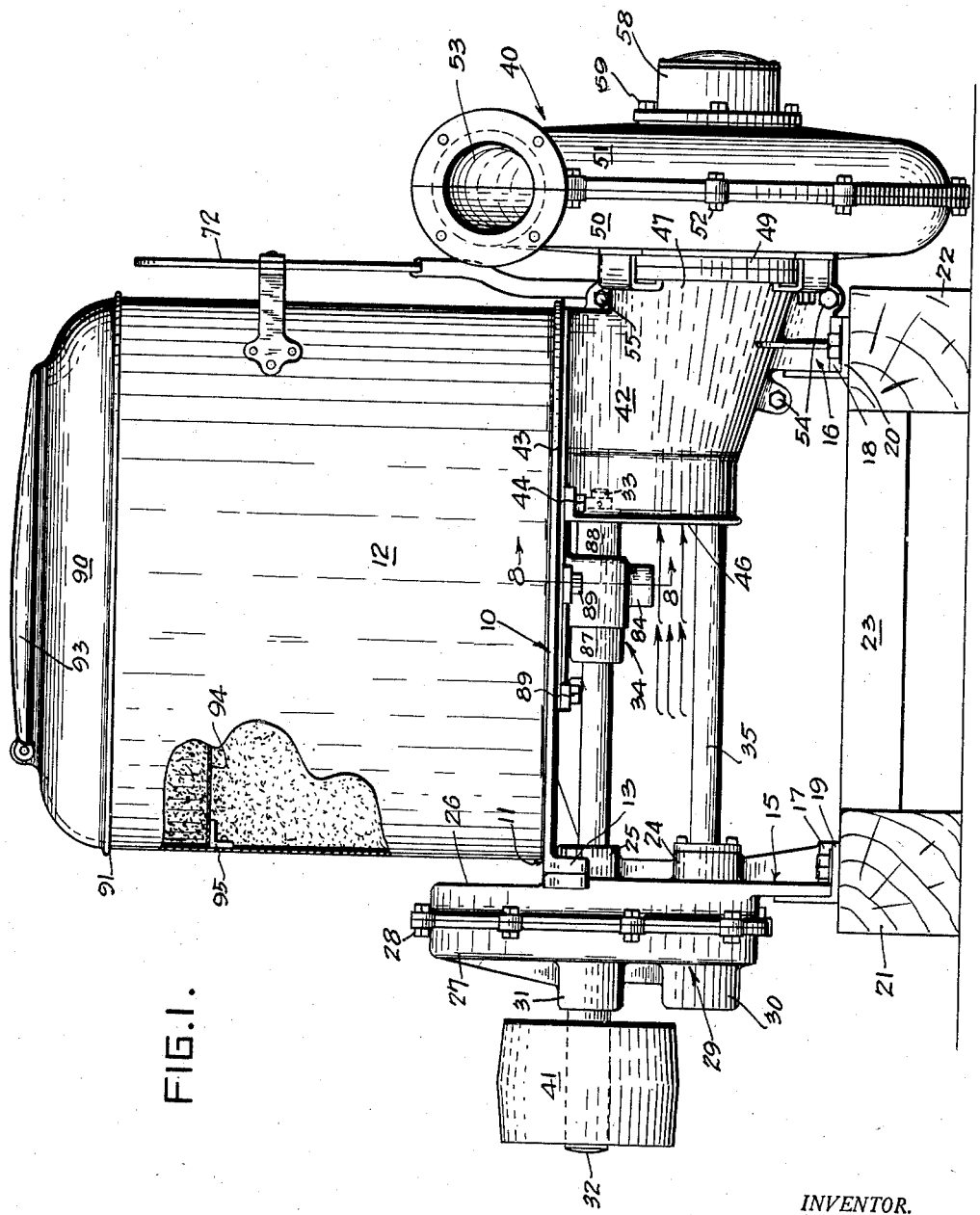
INVENTOR.
Jacob H. Wright
BY M. E. Frank
ATTORNEY

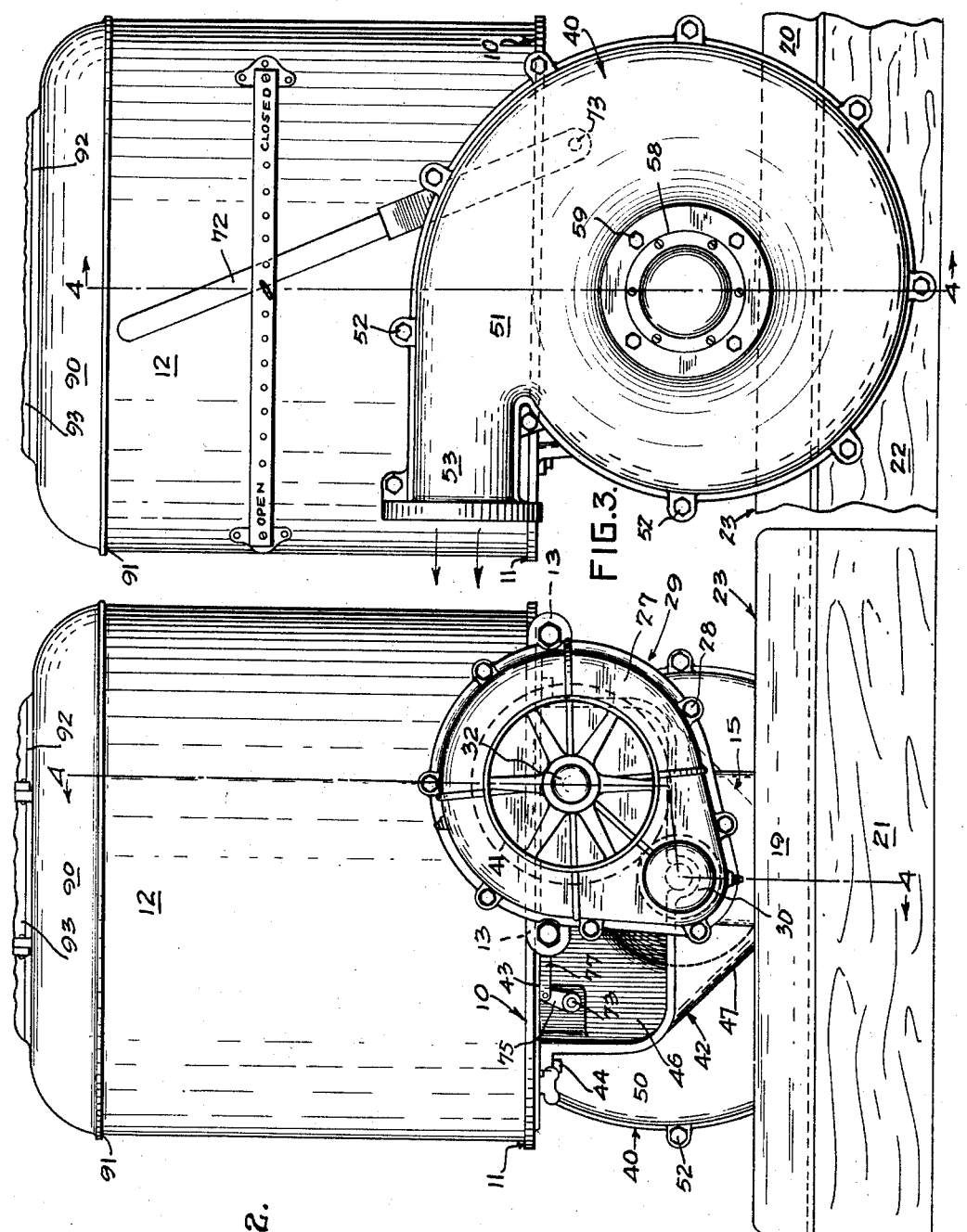

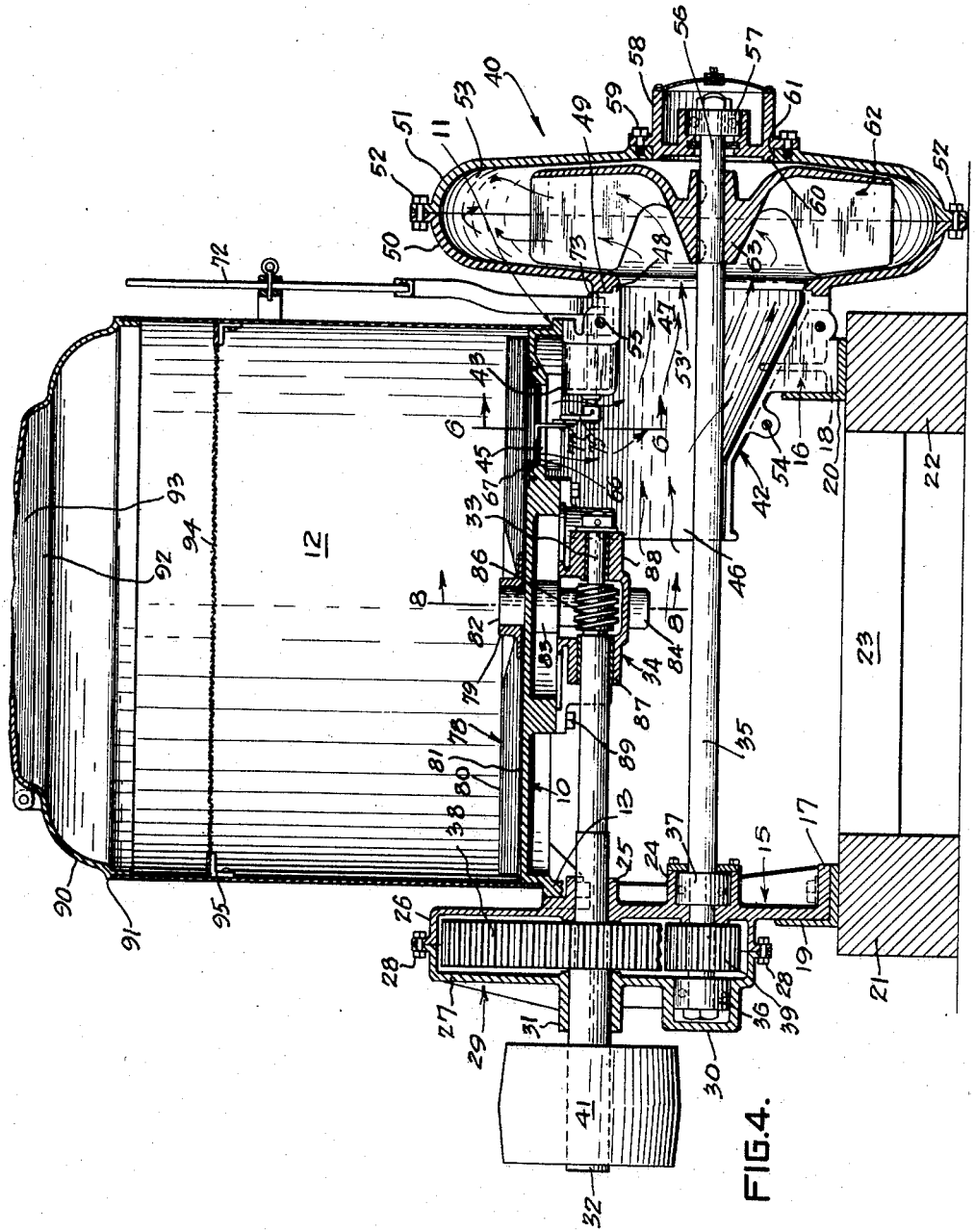

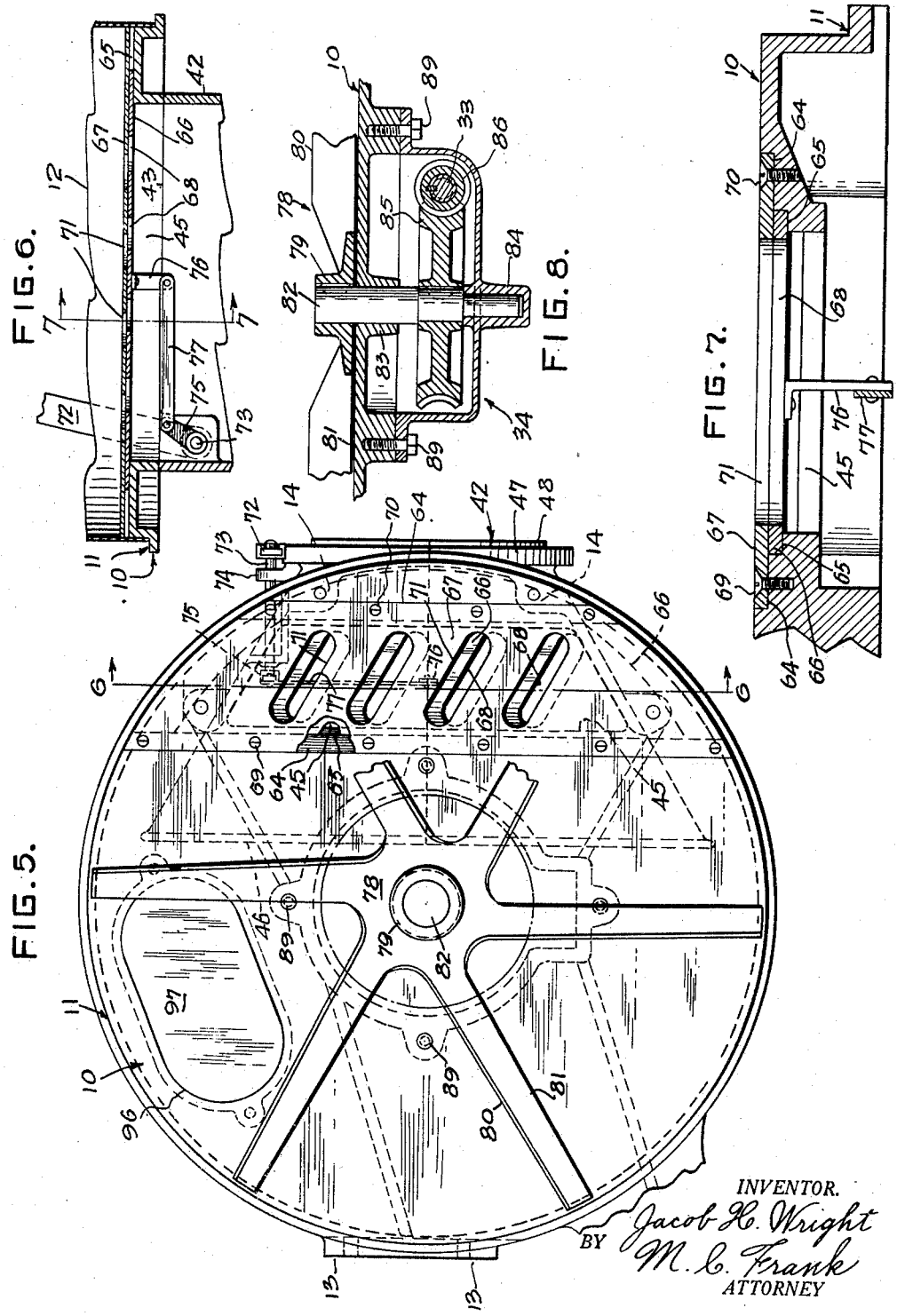

Patented Mar. 11, 1930

1,750,147

UNITED STATES PATENT OFFICE

JACOB H. WRIGHT, OF OAKLAND, CALIFORNIA, ASSIGNOR TO WESTERN SULPHUR COMPANY, INC., OF SAN FRANCISCO, CALIFORNIA, A CORPORATION OF CALIFORNIA

PLANT-DUSTING MACHINE

Application filed June 6, 1927. Serial No. 196,707.

This invention relates broadly to improvements in agricultural machinery and in particular to a plant-dusting machine, for applying insecticides to growing plants for the purpose of destroying insects injurious to plant life.

The present invention is an improvement to that class of dusting apparatus shown and described in my Patent No. 1,420,601, issued June 20, 1922, but differing considerably therefrom in that the various constructional details have been reduced, simplified and made more compact, thus providing a cheaper and more efficient device for the purpose of dusting plants or spreading fertilizing materials and the like.

My improved dusting machine is so designed and constructed that it may be mounted upon any suitable truck or trailer and connected to any suitable source of power carried thereby and moved between the rows of plants to be dusted.

The primary object of my invention is to provide a plant-dusting machine which is simple in construction, compact, efficient in operation and exceptionally durable.

Another object of my invention is to provide a dusting machine of the character designated which embodies a novel insecticide feed-control adapted for adjustment to control the insecticide or dust feed to the blower with which the feed is associated.

Another object of the invention is to provide in a machine of the character designated, an efficient high-speed fan blower, so designed and arranged relative to the powder container, that it creates a strong suction through a manifold having an opening to the air and an adjustable feed opening communicating with the powder container, thus causing a thorough mixing of the incoming air and dust, as the latter is discharged into the manifold by the feed-controlling means.

Still another object of the invention is the provision of a novel and efficient agitator, arranged in the bottom of the powder container in such a manner that the powder content thereat is continuously agitated when the machine is in operation.

The invention possesses other advantageous features, some of which, with the foregoing, will be set forth at length in the following description where I shall outline in full that form of the invention which I have selected for illustration in the drawings accompanying and forming part of the present specification. In said drawings I have shown one form of my invention, but it is to be understood that I do not limit myself to such form, since the invention, as expressed in the claims, may be embodied in a pulrality of forms.

Referring to said drawings:

Figure 1 is a front elevation illustrating the entire machine with the supports thereof mounted upon a suitable frame for handling;

Figure 2 is an elevation of the machine as seen looking from the driving gear side;

Figure 3 is the opposite side elevation as seen looking from the blower side of the machine;

Figure 4 is a transverse vertical sectional elevation taken through the entire machine and illustrates the gear drive means, the blower, agitator and agitator drive means;

Figure 5 is an enlarged plan view of the container supporting-plate with the container removed therefrom and the gear case and blower omitted; the view being illustrative of the agitator and feed-controlling means;

Figure 6 is a sectional detail of a portion of the container base and manifold, and showing the method of mounting the feed-controlling means in the base, also the connections for operating said controlling means; the section being indicated by the line 6—6 in Figures 4 and 5;

Figure 7 is an enlarged vertical transverse sectional detail taken through a feed opening in the base of the machine and showing the method of mounting the slidable powder-gauge plate therein, the section being indicated by the line 7—7 in Fig. 6; and Figure 8 is an enlarged sectional detail of the worm and worm gear drive for the agitator, the section being indicated by the lines 8—8 in Figs. 1 and 4.

Referring in detail to the various figures of the drawings in which the preferred embodiment of my invention has been shown, the numeral 10 designates the supporting plate which is preferably circular in plan and has an annularly arranged shoulder 11 which forms a support for a cylindrical container, or hopper 12.

The supporting plate is provided with diametrically opposed sets of ears 13 and 14, to which are rigidly bolted oppositely disposed supporting brackets 15 and 16, respectively, said supporting brackets being provided at their lower ends with feet 17 and 18, adapted for bolting to sections of angle-iron 19 and 20, which sections are in turn bolted or otherwise secured to the side members 21 and 22 of a suitable frame work 23, the whole being adapted for mounting upon any suitable conveyance, not shown.

The bracket 15 is provided with bearing bosses 24 and 25 and an integrally formed gear case section 26, and a mating section 27 is securely bolted to the section 26 by the bolts 28, the two sections forming a gear case 29, as clearly shown in Figure 4. The section 27 is provided with bearing bosses 30 and 31 arranged in aligned relation, respectively, with the bosses 24 and 25 of the section 26.

A main drive shaft 32 is mounted in the bearings 31 and 25 and extends inwardly slightly beyond the center of the plate 10, and is supported at its inner end 33 by means of a worm gear housing 34 which is carried centrally of the supporting plate 10, as hereinafter described.

A blower shaft 35 is mounted in the bearings 24 and 30 and is carried by ball-bearing members 36 and 37, Fig. 4, which ball-bearing members are fitted into the bearings 30 and 24, respectively. A gear 38 is mounted upon the shaft 32 and meshes with a pinion 39 which is keyed to the shaft 35, the ratios of the said gear and pinion being substantially four to one. The opposite extremity of the shaft 35 is borne by the blower housing 40, which is carried by the supporting bracket 16 as hereinafter described.

A pulley 41 is mounted upon the outer end of shaft 32 for belt connection to any source of driving power, not shown.

The blower housing 40 is bolted to the manifold 42, which in turn is integrally formed with the supporting bracket 16, and has its upper open edge 43 bolted to the underside of the supporting plate 10 by bolts 44, Figure 1; the said upper open edge communicates with an elongated transverse slot 45 formed in said supporting plate and the inner edge 46 of the manifold is open to the atmosphere, as clearly shown in Fig. 4. The outer end of the manifold terminates in a flanged neck 47, having a lip 48 over which is fitted the correspondingly formed annular neck portion 49 of the inner half 50 of the blower housing 40. The blower housing sections 50 and 51 are securely bolted together by the bolts 52 and form, as a unit, an ordinary spiral-shaped housing 40 having a suction inlet 53′ and a discharge outlet 53.

The manifold 42 is preferably formed of sections parted vertically as shown to advantage in Fig. 4; these half sections are bolted together by the lower bolts 54 and an upper bolt 55, the whole forming an odd-shaped member having a substantially rectangular open intake end 46, open top edge 43 and an outwardly and downwardly flared neck 47, as shown in Figs. 1, 2, 4 and 5.

The outer end 56 of the blower shaft 35 is reduced, as shown in Figure 4 and is supported in a ball-bearing member 57, which in turn is carried by an annular housing 58 bolted to the fan housing section 51 by a plurality of bolts 59; said housing 58 having an annular lip 60 formed on its inner end and adapted to center itself in the concentrically arranged opening 61 formed in said housing section 51 for its reception.

The fan 62 is provided with a hub 63 which is keyed to the shaft end 56 and consists of integrally cast and radially disposed blades of slightly angular arrangement relative to the axis of rotation and having their inner edges notched at the hub 63, as clearly shown in Figure 4, and adapted, when rotated at high speed, to create suction through the manifold opening 46 and to force air outwardly through the discharge outlet 53 of the blower housing 40.

The supporting plate 10 is provided in its upper face with a transversely arranged recess 64 positioned directly above the feed-slot 45 and also with a narrow guide-way 65, Figs. 5 and 7, stepped down from the recess 64. The guide-way 65 is provided with a slide-plate 66 adapted for sliding movement therein, said plate being provided with arcuate end edges terminating considerably short of the cover plate 67 and having a plurality of obliquely disposed slots 68 arranged therein and equally spaced throughout its length.

The cover plate 67 is mounted in the recess 64 and is secured in place by a plurality of screws 69 and 70, as shown in Figure 5, and is provided with a plurality of equally spaced and obliquely disposed slots 71 adapted to alternately register and non-register with the slots 68 of the plate 66. The cover plate 67 is flush with the upper face of the supporting plate 10 and the screws 69 and 70 are countersunk therein to form a smooth unbroken upper surface upon which the agitator 78 is mounted for the purpose of agitating the insecticide as hereinafter explained.

The slide plate 66 is slidably adjusted in its guideway 65 by means of a hand lever 72 mounted upon a rock shaft 73 carried by bearings 74, which bearings are mounted upon the rear side of the manifold 42; said shaft 73 extends through the manifold wall and is provided at its inner end with an arm 75 connected to a bracket 76, carried by the plate 66, by means of a link 77, Figs. 5, 6 and 7, so that when the lever 72 is moved to the left position as shown in Figure 3, the slots 68 and 71 will register and when said lever is moved to the right or opposite position these slots will non-register; thus any desired degree of adjustment may be had between these extreme movements to regulate the amount of discharge of the insecticide from the container, or hopper 12.

The agitator, Figs. 4 and 5, consists of a cast member 78 having a central hub 79 and radially disposed arms 80, which are angularly disposed relative to the upper face of the supporting plate 10 and have their lower edges 81 substantially contacting therewith. The outer ends of said blades terminate just short of the inner wall of the hopper and the agitator is rotated in a counter-clockwise direction by the main drive shaft to continuously agitate the body of insecticide within the hopper 12. The agitator is mounted upon a centrally disposed stub-shaft 82 which is carried by a boss 83 mounted on the underside of the supporting plate 10, and said shaft extends downwardly therefrom and has its lower end housed in a bearing boss 84 carried by the worm gear housing 34, as clearly shown in Figs. 4 and 8.

The shaft 82 is provided intermediate its ends with a worm gear 85 and the drive shaft 32 is provided upon its inner end 33 with a worm 86 adapted to mesh with said worm gear; said shaft 32 is borne by the aligned bearing bosses 87 and 88 which are integrally formed with the housing 34, and said housing 34 is flanged at its upper edge and is in turn bolted to the underside of the plate 10 by means of bolts 89 through said flange. The hopper is capped by means of a cast hood member 90 having an annular shoulder 91 which fits over the upper open edge of the hopper 12, said hood member having a central opening 92 which is normally closed by a hinged cover 93.

A circular screen 94 may be inserted in the hopper 12 and held in place by means of a plurality of brackets 95, as shown in Figs. 1 and 4, said screen tending to sift the insecticide as it works through the hopper.

The insecticide most commonly used for dusting purposes is sulphur and the present machine is best adapted to such an insecticide, although it is to be understood that any insecticide of powder form may be used in conjunction with my machine with equal advantage. A clean-out opening 96 is formed in the plate 10 and is provided with a cover plate 97, as shown in Figure 5, for the purpose of cleaning the hopper when occasion requires it. In recapitulation:

It will be understood that the flanged discharge end of the blower is provided with any suitable connection, such as a hose, (not shown) and to which may be secured a nozzle for directing the insecticide to any suitable point in the intermediate vicinity of the machine; this connection and its operation is the subject matter of another patent application to be filed by me immediately following the present application.

While I have not shown any means of transport for the present machine, it is of course, to be understood that it is mounted upon any suitable conveyance and drawn between the rows of plants to be dusted and power is supplied from any convenient source for its operation.

When the pulley 41 is driven at a moderate speed the agitator 78 is slowly rotated and the blower 62 rotated relatively much faster, and when the hand lever 72 is manipulated to cause the registration of the openings 68 and 71 in the plates 66 and 67 the insecticide is fed through the opening 45 and is immediately incorporated with the incoming column of air and thoroughly mixed therewith during and throughout its travel to the blower discharge and from which point it is delivered in a thoroughly atomized state upon the plants to be dusted.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, I claim as new and desire to secure by Letters Patent of the United States, the following:

1. In a plant-dusting machine; a hopper having a plane bottom; a rotary agitator in said hopper and having its blades arranged to form substantially a scraping contact with the hopper bottom; a manifold mounted below said hopper, said manifold having an open air intake end, an outlet end, and a feed opening communicating with said hopper; means operative between said hopper and feed opening for regulating the flow of material from said hopper; a blower carried by said manifold and having its suction side connected to the outlet end thereof; a drive shaft; and gear means for driving said agitator and blower from said shaft.

2. In a machine of the class described; a hopper; a rotary agitator; a manifold mounted below said hopper, said manifold providing a horizontal passage having inlet and outlet openings, and a feed opening at the top thereof communicating with said hopper; a rotary blower carried by said manifold having its suction side connected to the outlet end of the manifold and its rotor shaft extending freely through said manifold passage and from the inlet opening thereof; a drive shaft arranged to be power driven; and gear means connecting said agitator and said blower shaft with said drive shaft.

3. In a machine of the class described, a supply hopper; a mechanical agitator in said hopper; a manifold disposed below said hopper and providing a horizontal passage having inlet and outlet openings and a feed opening at the top thereof communicating with said hopper; a blower having its suction side connected to the outlet end of the manifold and its rotor shaft extending freely through said manifold passage and from the inlet opening thereof; a drive shaft; and means connecting said agitator and said blower shaft with said drive shaft for simultaneous operation thereby.

In testimony whereof, I affix my signature.

JACOB H. WRIGHT.